(12) United States Patent
Sahoo et al.

(10) Patent No.: US 8,726,372 B2
(45) Date of Patent: May 13, 2014

(54) SYSTEMS AND METHODS FOR SECURING CONTROLLERS

(75) Inventors: Manas Ranjan Sahoo, Hyderabad (IN); Justin Brandon Chong, Salem, VA (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 13/460,721

(22) Filed: Apr. 30, 2012

(65) Prior Publication Data

US 2013/0291094 A1   Oct. 31, 2013

(51) Int. Cl.
| | | |
|---|---|---|
| G06F 15/16 | (2006.01) | |
| G06F 17/30 | (2006.01) | |
| H04L 29/06 | (2006.01) | |
| G06F 12/00 | (2006.01) | |
| G06F 11/00 | (2006.01) | |

(52) U.S. Cl.
USPC .............. 726/19; 726/7; 709/217; 714/11; 714/15

(58) Field of Classification Search
USPC .......... 713/168–174, 182–186, 202; 709/225, 709/229; 726/2–19
See application file for complete search history.

(56) References Cited

U.S. PATENT DOCUMENTS

| | | | |
|---|---|---|---|
| 5,774,652 A | 6/1998 | Smith | |
| 7,877,627 B1 * | 1/2011 | Freydel | 714/11 |
| 8,121,707 B2 | 2/2012 | Karaffa et al. | |
| 2008/0175388 A1 | 7/2008 | Okabe et al. | |
| 2009/0077638 A1 * | 3/2009 | Norman et al. | 726/5 |
| 2009/0171479 A1 | 7/2009 | Oosako | |
| 2010/0192208 A1 | 7/2010 | Mattsson | |
| 2010/0313264 A1 | 12/2010 | Xie et al. | |
| 2012/0246555 A1 * | 9/2012 | Masten | 715/234 |
| 2013/0067551 A1 * | 3/2013 | Frew et al. | 726/7 |

FOREIGN PATENT DOCUMENTS

| | | |
|---|---|---|
| EP | 0891611 B1 | 1/1999 |
| WO | 2005069823 A2 | 8/2005 |

OTHER PUBLICATIONS

U.S. Appl. No. 13/460,759, filed Apr. 30, 2012, Socky et al.
U.S. Appl. No. 13/460,779, filed Apr. 30, 2012, Chong et al.
U.S. Appl. No. 13/460,794, filed Apr. 30, 2012, Chong et al.
U.S. Appl. No. 13/460,801, filed Apr. 30, 2012, Chong et al.
U.S. Appl. No. 13/460,771, filed Apr. 30, 2012, Pettigrew et al.

* cited by examiner

*Primary Examiner* — Evans Desrosiers

(74) *Attorney, Agent, or Firm* — Fletcher Yoder, P.C.

(57) ABSTRACT

A system includes a control system having a plurality of controllers configured to control a process. Each controller of the plurality of controllers further includes a secure repository configured to store a login credential. The control system is configured to authorize a user action by comparing a user credential against the login credential of each of the plurality of controllers.

20 Claims, 3 Drawing Sheets

SYSTEMS AND METHODS FOR SECURING CONTROLLERS

BACKGROUND OF THE INVENTION

The subject matter disclosed herein relates to systems and methods for securing devices, and more particularly, for securing controller devices.

Certain devices such as sensors, pumps, valves, and the like, may be controlled by a control system using pneumatic, hydraulic, and/or electrical signals. For example, a valve opening may be controlled based on a 4-20 mA signal from a controller. The control system may use a communications network to send and receive signals to and from the various devices. Unfortunately, the controllers may be susceptible to use in an unauthorized manner or by unauthorized users.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a control system having a plurality of controllers configured to control a process. Each controller of the plurality of controllers further includes a secure repository configured to store a login credential. The control system is configured to authorize a user action by comparing a user credential against the login credential of each of the plurality of controllers.

In a second embodiment, a non-transitory machine readable medium having executable instructions configured to authenticate a first login credential of a first controller included in a control system, compare the first login credential to a second login credential of a second controller included in the control system, and if the first login credential does not match the second login credential, then to provide an indication of possible controller system tampering.

In a third embodiment, a method includes inputting a login credential, encrypting and storing the login credential across all of a plurality of controllers of a redundant control system, and performing a security check of the redundant control system by using the login credential.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
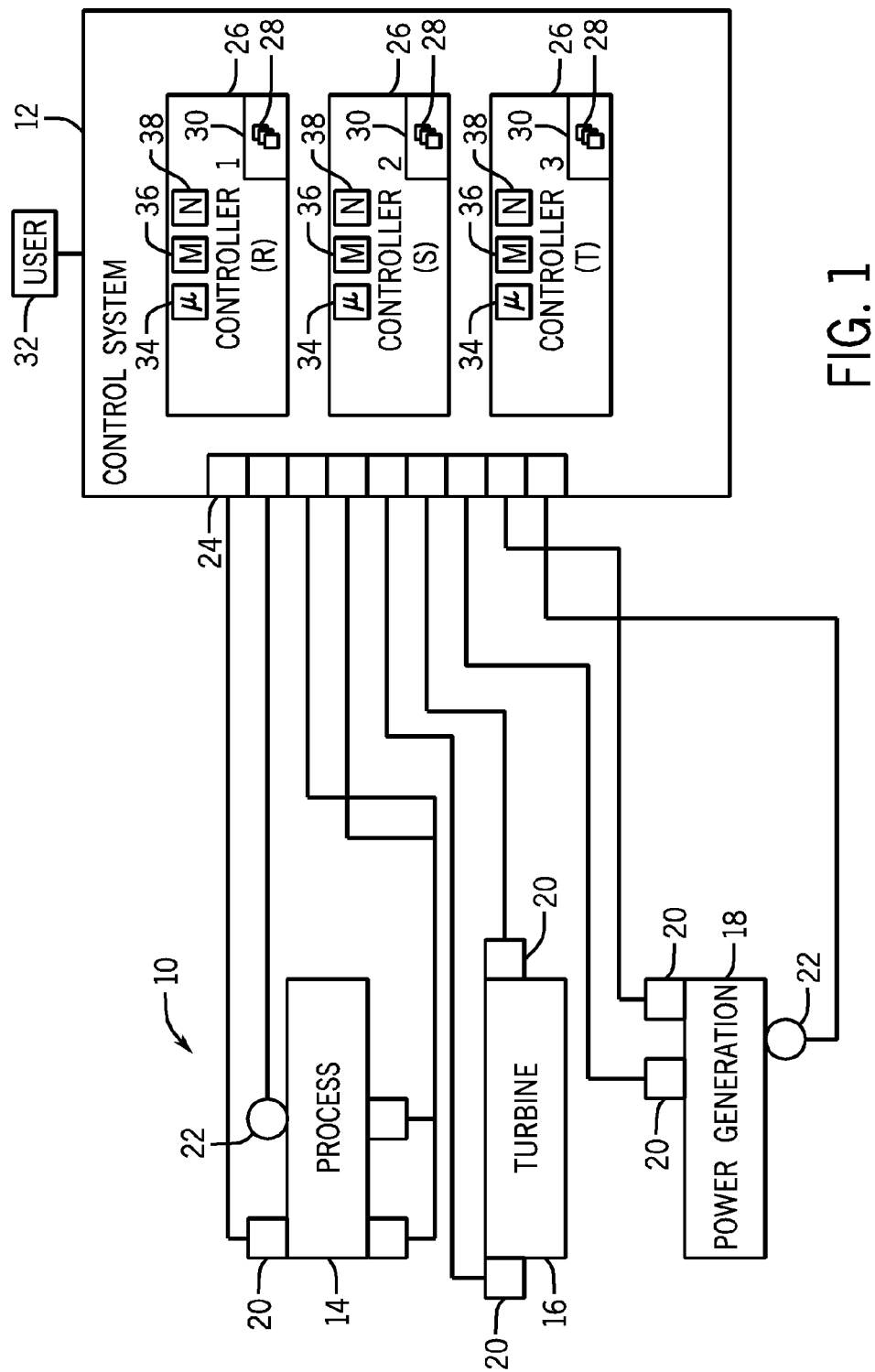
FIG. 1 is a schematic diagram of an implementation of a control system, in accordance with aspects of the present disclosure.

One or more specific embodiments of the invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the invention, the articles "a," "an," "the," and "said" are intended to mean that there are one or more of the elements. The terms "comprising," "including," and "having" are intended to be inclusive and mean that there may be additional elements other than the listed elements.

The disclosed embodiments include systems and methods suitable for securing one or more controllers (e.g., industrial controllers) through synchronization of login credentials. Synchronization of login credentials across all controllers in a redundant controller system may enable the detection of security threats, which allows users to take appropriate measures to prevent unauthorized access or control.

In certain embodiments described in further detail below, all controllers in a redundant controller system may be programmed or otherwise designed to have synchronized login credentials. That is, login credentials for entities such as users (e.g., plant operators, commissioning engineers, control engineers, system administrators), external software systems, external hardware systems, and/or other controllers, may be communicatively compared and coordinated across one or more controllers of a redundant control system, such as a Triple module Redundant (TMR) system. The redundant controller system may be configured to regularly check for consistency in login credentials across some or all of the controllers. The user or control center may be alerted when a discrepancy is detected between the controllers, which may indicate a security event or an error that may result in further attention and/or action. In certain embodiments, the control system 12 may include a dual redundant control system having two controllers or a redundant system having four or more controllers.

Various synchronization techniques may be used, including a first come and first serve, a round robin, a priority scheduling, and so on, to compare and/or synchronize credentials. Accordingly, the user may be able to visualize if there are any login credential inconsistencies across the controllers in a redundant controller system or in separate control systems, and take the appropriate defensive action in response to the alert. Indeed, the detection and alert techniques described herein may further improve the control system's security.

Turning now to the figures, FIG. 1 depicts a system 10 coupled to a control system 12 in accordance with an embodiment of the present invention. The system 10 may include, for example, a process 14, a turbine 16, a power generation component 18, or any other component or combination thereof. The process 14 may comprise a variety of operational components, such as electric motors, valves, actuators, sensors, or a myriad of manufacturing, processing, material handling and other applications. Further, the process 14 may comprise control and monitoring equipment for regulating process variables through automation and/or observation. The turbine 16 may include a steam turbine, a gas turbine, a wind turbine, a hydro turbine, or any combination thereof. For example, the turbine 16 may include a combined cycle having a gas turbine, a steam turbine, and a heat recovery steam generation (HRSG) system. Furthermore, the turbine 16 may drive the power generation component 18, which may include an electrical generator. Alternatively, in some embodiments the turbine 14 and/or the power generation component may be solar-powered. The turbine 16 and power generation component 18 may include any number of operational components, such as motors, rotary components, power electronics, sensors, actuators, etc.

The illustrated process 14, turbine 16, and power generation component 18 may include any number of sensors 20 and actuators/motors 22. The sensors 20 may include any number of devices adapted to provide information regarding process conditions. For example, the sensors 20 may monitor temperature, pressure, speed, fluid flow rate, vibration, noise, exhaust emissions, power output, clearance, or any other suitable parameter The actuators 22 may similarly include any number of devices adapted to perform a mechanical action in response to an input signal. For example, the actuators 22 may control a fuel injection rate, a diluent or water injection rate, a coolant rate, a power output level, a speed, a flow rate, a clearance, and so forth. It is also to be noted that the system 10 may include devices suitable for use in residential applications, such as home automation applications.

As illustrated, these sensors 20 and actuators 22 are in communication with the control system 12, such as through interfaces 24. The control system 12 may include one, two, three, or more controllers 26 (e.g., programmable logic controllers) that may operate in any manner suitable for monitoring and controlling the system 10. For example, FIG. 1 depicts a system having three controllers, Controller 1, Controller 2, and Controller 3. Alternatively, these controllers 26 may be referred to as Controller R, Controller S, and Controller T. The sensors 20 and actuators 22 may be in direct communication with any or all of the controllers 26. These devices may be utilized to operate process equipment. Indeed, they may be utilized within process loops that are monitored and controlled by the control system 12 and the controllers 26. In certain embodiments, the controllers 26 may be separate and/or integral with the process 14, the turbine 16, and/or the power generation component 18. Additionally, the multiple controllers 26 may provide added security In certain embodiments, the control system 12 may include a three controller system 12, as depicted in FIG. 1 and described below. Such a control system 12 may be referred to as a Triple Module Redundant (TMR) control system. In such an embodiment, the three controllers 26 provide three layers of redundancy. In some embodiments, such TMR systems may use a state-voting algorithm between redundant controllers to determine the appropriate state or action of the system 10 being monitored and controlled. The controllers 26 may "vote" to determine the next action (e.g., step) to take in the control logic, based on the state information of each controller 26. The majority vote determines the selected action. For example, in using a state-voting algorithm, two of the controllers, e.g., controllers R and T, having the same state may "outvote" a third controller, e.g., controller S, having a different state. In this manner, the control system 12 may rely on the majority of controllers 26 as providing a more reliable state (and action) for the system 10 being monitored and controlled.

As the controllers 26 may be used to control and collect data from many aspects of plant equipment and processes, the control system 12 and controllers 26 may be secured against unauthorized users through the use of login credentials 28, stored, for example, in a secure repository 30. The login credentials 28 may include a username and password combination used to gain access to the control system 12. The login credentials may additionally or alternatively include software token credentials, hardware token credentials, biometric credentials, challenge-response authentication credentials, personal identification number (PIN) credentials, mutual authentication credentials, or a combination thereof The secure repository 30 may include an encrypted file system, an encrypted database, or a combination thereof. Indeed, the secure repository 30 may include any secure repository resource providing for intrusion and/or "hacking" protection. In one embodiment, each controller R, S, T, may include a separate secure repository 30, each secure repository 30 storing a generally identical copy of the login credentials 28, as depicted. In another embodiment, the login credentials 28 may not be identically stored in each secure repository 30, such that each repository 30 may store more or less credentials 28 when compared to the other repositories 30. In yet another embodiment, the separate secure repositories 30 may be disposed separate from their respective controllers R, S, T, and communicatively coupled to the controllers R, S, T through cables or conduits, and/or secure wireless techniques (e.g., encrypted wireless techniques).

A user 32 attempting to access the controllers 26 may be asked to input their login credentials 28, such their username and/or password, in order to gain access to the control system 12. The user 32 may include a human user, such as a plant operator, a commissioning engineer, a programmer, and/or a system administrator. The user 32 may also include software and/or hardware entities, such as another controller 26, another control system 12, a software agent, or other software programs.

Once access is gained, the user may then view data, change certain control parameters, and in general, manipulate the control system 12 commensurate, for example, with certain permissions associated with the user's 32 role (e.g., system administrator, commissioning engineer, programmer, plant operator, software agent, other controller). In a presently contemplated embodiment, the user 32 may be asked to log in once, and then the controllers R, S, and T may each independently verify the user's 32 login credentials 28, as described in more detail below with respect to FIGS. 2 and 3. In the present embodiment, in order to further secure the control system 12, any new user's login credentials 28 may be distributed and synchronized among each of the secure repository 30 such that they are generally identical. The control system 12 may also be configured to regularly assess the condition of the stored login credentials 28 of each controller 26 to determine that they have not been maliciously or erroneously removed, corrupted, or otherwise altered. Specifically, the controllers 12 may be configured to check that the respective login credentials 28 of all of the controllers 26 are still synchronized with each other. By synchronizing login credentials 28, the control system 12 may substantially improve security.

Each controller 26 may include a processor 34, a memory 36, and a networking or communication device 38. The memory 36 may store operational instructions and data of the controller 26 in a tangible, non-transitory, computer-readable medium, such as instructions for performing the techniques described herein. The memory 36 may include, for example, random-access memory (RAM), read-only memory (ROM), hard drive(s), and/or optical discs. Likewise, the processor 34 may be used to execute computer instructions, including computer instructions stored in the memory 36. The networking or communication devices 38 enable the controllers 26 to send and receive information to other controllers 26 and/or control systems 12. This communication may be via a peer-to-peer communication network or another network such as wired network, wireless network, or combination thereof The networking devices 38 may support a variety of communication protocols, including the Institute for Electrical and Electronic Engineers (IEEE) standard 1588-2002 or newer, implementing a Precision Time Protocol (PTP) for exchanging information, such as clock information, among the controllers 26. The networking device 38 may support other communication standards, including Ethernet protocols, Multiple Processor Machine (MPM) protocols, shared memory protocols, and the like. The networking devices 38 may also support secure socket layer (SSL), transport layer security (TLS), Kerberos, or another cryptographic protocol.

It is to be noted that the control system 12, which is depicted in FIG. 1 as an industrial application, is greatly simplified for purposes of illustration. The number of components is generally many times greater than the number of depicted components. Indeed, in an industrial environment, the number of devices may number in the hundreds for an industrial process control system 12. Accordingly, the scope of the control system 12 may vary based on the location in which it is implemented. In certain embodiments, the control system 12 may be installed in a home, and the number of components may be less than the number depicted in FIG. 1, and the types of components may be different as well.

Figure 2:
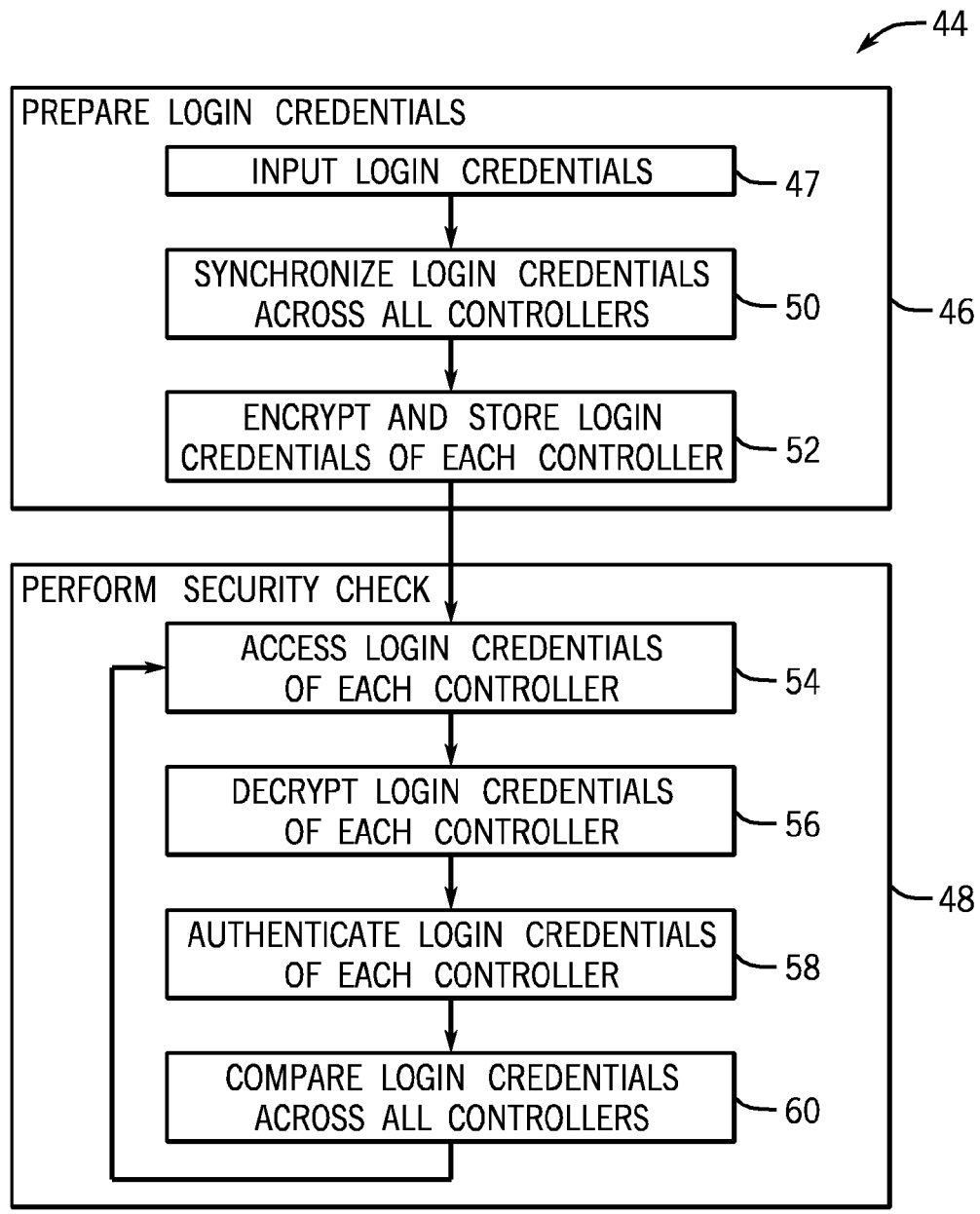
FIG. 2 is a flowchart of an embodiment of a process to secure the control system of FIG. 1, in accordance with aspects of the present disclosure.

FIG. 2 is a flow chart depicting an embodiment of a process 44 of securing the control system 12, by using synchronized login credentials. The process 44 may be implemented by using a non-transitory machine readable medium including code executable by the control system 12. The process 44 includes two main subprocesses, such as preparing (block 46) login credentials and performing (block 48) a security check. Preparing (block 46) login credentials generally refers to inputting or otherwise entering the login credentials 28 into the control system 12, and then distributing the login credentials 28 so that each controller 26 includes a similar copy.

The login credentials 28 may be entered (block 47) in a secure manner into the system 12, for example, by using encryption techniques. This process 44 may further include synchronizing (block 50) the login credentials 28 across all controllers 26 in the control system 12, such as by distributing the same login credentials into each controller 26. For example, secure transmission techniques such as SSL, Kerberos, and/or TLS may be used to distribute and synchronize the login credentials 28 amongst the controllers 26. The login credential may then be encrypted and stored (block 52) independently on each secured storage 30 of each controller 26 in the control system 12. The process 44 may then perform (block 48) on-demand, periodic and/or random security checks. In order to perform a security check (block 48), the process 44 may access (block 54) the previously stored login credentials 28 of each controller 26 in the control system 12. As the login credentials 28 may have been encrypted, the next step may be to decrypt (block 56) the login credentials 28 of each controller 26. The process 44 may then authenticate the login credentials 28 of each controller 26. The process 44 may then compare the login credentials 28 of all or some of the controllers 26 to confirm that the login credentials 28 are still synchronized and/or valid. The security check steps (blocks 54-60) may be repeated based upon predetermined time intervals, on demand, and/or at random. In certain embodiments, the security check steps (blocks 54-60) may be initiated or repeated upon any user login attempt or other indication of controller activity, such as controller access activity by a human entity, hardware entity and/or software entity. During the process 44, if any authentication or test fails, or if an error arises, an authorized user may be notified via an alert (e.g., through an alert display, sound, etc.), as this may indicate a potential security threat. The alert may be sent to an authorized user device such as a computer, wireless device, workstation, control center, and so forth.

Figure 3:
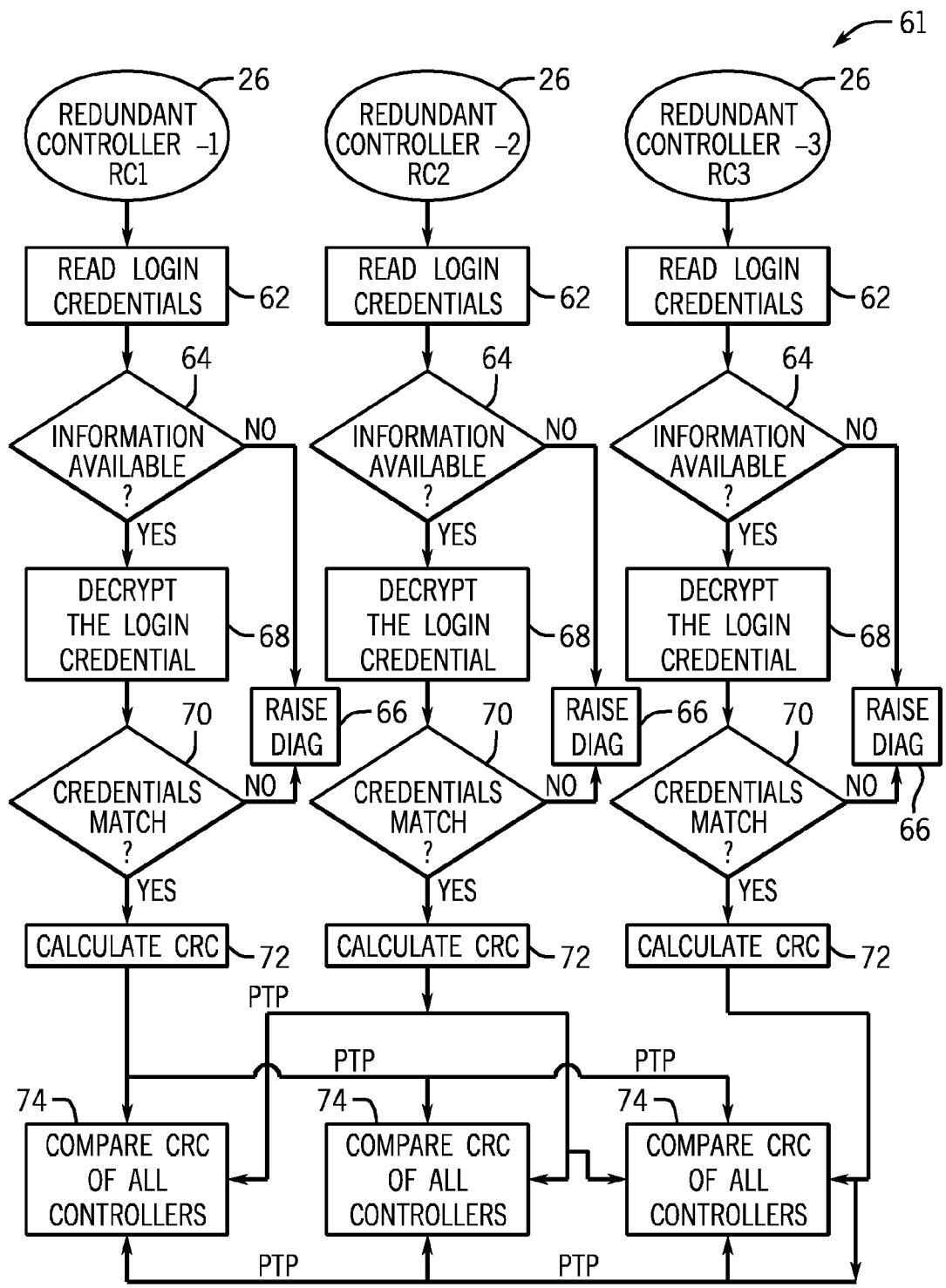
FIG. 3 is a flowchart of an embodiment of a process to monitor security of the control system of FIG. 1, in accordance with aspects of the present disclosure.

FIG. 3 is a flow chart that illustrates an embodiment of a process 61 for performing a security check or login authentication, for example, by using synchronized login credentials. As shown, each controller 26 of the control system 12 may perform the process 61, generally, in parallel. In other embodiments, the process 61 may be performed asynchronously. Each of the controllers 26 may attempt to read (block 62) the login credentials 28 from their respective secure repository 30. Each controller 26 may then detect (decision 64) whether the login credentials are available. If the login credentials are not available (decision 64), the controller 26 may raise (block 66) a diagnostic alert or alarm to notify of the error. This may indicate a potential security threat as the login credentials may have been removed by an unauthorized party or hacker, or may be due to a system error that requires maintenance. If the login credentials are available (decision 64), the controllers 26 may then decrypt (block 68) the login credentials 28. The decrypted login credentials 28 may then be authenticated (decision 70) by matching the decrypted (block 68) login credentials 28 against the read (block 62) login credential 28. If the login credentials do not match (decision 70), the controller 26 may raise (block 66) a diagnostic alarm or notify of the error, as this may indicate a security threat or system error. It should be noted that the login credential 28 that is read (block 62) may be a user inputted login credential or an existing, decrypted login credential. If the login credentials are successfully authenticated (decision 70), the process 61 may calculate (block 72) a cyclic redundancy check (CRC) code. The CRC code is a unique number or code that may be generated from the login credentials 28, for example, by using a CRC generation algorithm, table, or any other CRC generation technique. Generally, every unique string generates a unique CRC code, which may be expressed as a unique CRC number. It is to be noted, that, in other embodiments, other techniques useful in generating unique codes may be used instead of or in addition to the CRC code, for example, hash codes, electronic signatures, and so on. Once a unique login code has been generated for the matched login credentials 28, the unique login code generated by each controller may then be communicated for comparison (block 74) to each of the other controllers 26, for example, by using the networking device 38. In this manner, all the controllers 26 may independently verify the login credentials 28. If it is detected that the login credentials 28 are not consistent across every controller 26 in the control system 12, a diagnostic alarm or alert may be raised (block 66), to notify of the event. This may indicate that an unauthorized user has hacked or gain unauthorized entry into a controller 26 and/or altered the login credentials 28. Appropriate actions may then be taken.

Comparison (block 74) of the CRC codes for the login credentials 28 across the controllers 26 may be implemented by a variety of techniques. For example, Precision Time Protocol (PTP) may be used to synchronize clocks in each controller 26. In one example, priority scheduling may be used in which the current master controller 26 may start the comparison process (block 74), and then query the slave controllers 26. In another example, a controller 26 may be selected in a first come first serve fashion, until all controllers have compared (block 74) CRC codes. In another example, a round robin approach may be used, in which one controller 26 may be selected at random, and then subsequent controllers 26 queried in a cyclical manner.

By performing the security check based on synchronized login credentials 28, security threats may be detected, reported, and corrected in a timely manner. If the login credentials 28 of the controllers 26 are found to be consistent, a security confirmation indication may be produced rather than an alarm. In some embodiments, no event occurs after the login credentials are found to be consistent. In certain embodiments, the controllers 26 and/or control system 12 may be configured to repeat the security check process based on a predetermined time interval or event, at random, or on demand.

Technical aspects of the present disclosure include securing controllers in a redundant control system, such as a triple module redundant (TMR) control system. The present techniques may secure the control system through the use of login credential synchronization, in which the login credentials of every controller in the control system is synchronized and/or compared with each other. As such, if one or more controller's login credential is maliciously altered, the change may be detected and the threat brought to the attention of an authorized user or user device. Thus, the disclosed techniques allow the authorized user to take appropriate actions to protect the control system from security threats.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
   a control system comprising a plurality of controllers configured to control a process,
   wherein each controller of the plurality of controllers comprises a secure repository configured to store a login credential, and
   wherein the control system is configured to:
   receive a login credential;
   encrypt and store the login credential across each controller of the plurality of controllers of a redundant control system;
   perform a security check of the redundant control system by using the login credential; and
   authorize a user action by comparing a user credential against the login credential of each of the plurality of controllers, and if the user action is authorized, wherein the control system is configured to execute a vote among the plurality of controllers to determine a next action to execute in a control logic.

2. The system of claim 1, wherein the plurality of controllers comprises three controllers, and the control system comprises a triple modular redundant (TMR) control system, or the plurality of controllers comprises two controllers and the control system comprises a dual redundant control system, or the plurality of controllers comprises four or more controllers and the control system comprises a redundant control system.

3. The system of claim 1, wherein the secure repository comprises an encrypted filesystem, an encrypted database, or a combination thereof.

4. The system of claim 1, wherein the plurality of controllers are configured to synchronize the storage of a new login credential across all of the plurality of controllers.

5. The system of claim 1, wherein the plurality of controllers are configured to check for consistency of the login credential between the plurality of controllers based upon a request, at a predetermined time interval, at random, or a combination thereof.

6. The system of claim 1, wherein the login credential comprises a username/login combination, a biometric data, a challenge-response data, a personal identification number (PIN), a mutual authentication data, or a combination thereof 7. The system of claim 1, comprising an industrial plant, wherein the control system is coupled to the industrial plant.

8. The system of claim 1, wherein each of the plurality of controllers comprises a networking device configured to communicate with at least one other of the plurality of controllers.

9. The system of claim 8, wherein the networking device is configured to support a Precision Time Protocol (PTP), an Ethernet protocol, a Multiple Processor Machine (MPM) protocol, a shared memory protocol, or a combination thereof.

10. A non-transitory machine readable medium comprising executable instructions configured to:
    receive a login credential;
    encrypt and store the login credential across each controller of a plurality of controllers of a redundant control system wherein each controller of the plurality of controllers comprises a secure repository configured to store the login credential;
    perform a security check of the redundant control system by using the login credential;
    authenticate a first login credential of a first controller included in the plurality of controllers;
      compare the first login credential to a second login credential of a second controller included in the plurality of controllers;
      if the first login credential does not match the second login credential, then to provide an indication of possible controller system tampering, and;
    authorize a user action by comparing a user credential against the login credential of each of the plurality of controllers, and if the user action is authorized, execute a vote among the plurality of controllers to determine a next action to execute in a control logic.

11. The non-transitory machine readable medium of claim 10, wherein the executable instructions configured to compare the first login credential to the second login credential comprise executable instructions configured to:
    calculate a first code based on the first login credential;
    calculate a second code based on the second login credential; and
    compare the first code to the second code.

12. The non-transitory machine readable medium of claim 11, wherein the executable instructions configured to calculate the first code based on the first login credential comprise executable instructions configured to calculate a cyclic redundancy check (CRC) code, a hash code, an electronic signature code, or a combination thereof.

13. The non-transitory machine readable medium of claim 10, wherein the executable instructions configured to authenticate the first login credential comprise executable instructions configured to:
    read a user credential;

decrypt an encrypted login credential based on the user credential to derive a decrypted login credential;

compare the decrypted login credential to the user credential;

if the decrypted login credential matches the user credential, then authenticate the first login credential.

14. The non-transitory machine readable medium of claim 10, wherein the executable instructions are configured to be executable by the control system, and wherein the control system comprises a redundant control system comprising at least the first and the second controller.

15. The non-transitory machine readable medium of claim 10, wherein the first and the second login credentials comprise a username/password combination, a biometric data, a challenge-response data, a personal identification number (PIN), a mutual authentication data, or a combination thereof.

16. The non-transitory machine readable medium of claim 10, wherein the executable instructions configured to compare the first login credential to the second login credential of the second controller included in the control system comprises executable instructions configured to use a round robin synchronization, a first come first serve synchronization, a priority synchronization, or a combination thereof.

17. A method comprising:
receiving a login credential;
encrypting and storing the login credential across all of a plurality of controllers of a redundant control system, wherein each controller of the plurality of controllers comprises a secure repository configured to store the login credential;

performing a security check of the redundant control system by using the login credential; and authorizing a user action by comparing a user credential against the login credential of each of the plurality of controllers, and if the user action is authorized, executing a vote among the plurality of controllers to determine a next action to execute in a control logic.

18. The method of claim 17, wherein performing the security check comprises:
receiving a user credential;
accessing an encrypted login credential from each of the plurality of controllers based on the user credential;
decrypting each encrypted login credential to derive a decrypted credential;
matching the decrypted credential of each of the plurality of controllers to the user credential; and
if any of the plurality of controllers does not match the user credential to the decrypted credential, then providing an indication of possible controller system tampering.

19. The method of claim 17, wherein performing the security check of the redundant control system comprises checking for consistency of the login credential between the plurality of controllers based upon a request, at a predetermined time interval, at random, or a combination thereof.

20. The method of claim 18, wherein matching the decrypted credential of each of the plurality of controllers to the user credential comprises using a round robin synchronization, a first come first serve synchronization, a priority synchronization, or a combination thereof, to match the decrypted credential across all of the plurality of controllers.

* * * * *